United States Patent
Gongloor et al.

(10) Patent No.: US 12,530,351 B2
(45) Date of Patent: Jan. 20, 2026

(54) GENERATING RECOMMENDATIONS BASED ON PREDICTED QUERY EXECUTION PLAN PERFORMANCE

(71) Applicant: Oracle International Corporation, Redwood Shores, CA (US)

(72) Inventors: Prabhaker Gongloor, San Jose, CA (US); Shantanu Joshi, Santa Clara, CA (US); Mughees A. Minhas, Palo Alto, CA (US); Karl Dias, Foster City, CA (US); Sriram Vrinda, Hudson, NH (US); John M. Beresniewicz, Half Moon Bay, CA (US); Daniel S. Tow, Palo Alto, CA (US); Girish Kumar Balachandran, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 23 days.

(21) Appl. No.: 18/595,820

(22) Filed: Mar. 5, 2024

(65) Prior Publication Data

US 2025/0094421 A1    Mar. 20, 2025

Related U.S. Application Data

(60) Provisional application No. 63/583,499, filed on Sep. 18, 2023.

(51) Int. Cl.
*G06F 16/00* (2019.01)
*G06F 16/2453* (2019.01)

(52) U.S. Cl.
CPC .. *G06F 16/24542* (2019.01); *G06F 16/24537* (2019.01)

(58) Field of Classification Search
None
See application file for complete search history.

(56) References Cited

U.S. PATENT DOCUMENTS

| | | | |
|---|---|---|---|
| 9,189,522 B2 * | 11/2015 | Das | G06F 16/24542 |
| 2021/0081409 A1 * | 3/2021 | Rath | G06F 11/3419 |
| 2022/0207284 A1 * | 6/2022 | Duvvuri | G06N 7/01 |

OTHER PUBLICATIONS

Li et al. (CN-115544029-A), "Data Processing Method and Related Device", Dec. 30, 2022, 23 Pages. (Year: 2022).*

* cited by examiner

*Primary Examiner* — Bai D Vu
(74) *Attorney, Agent, or Firm* — Invoke

(57) ABSTRACT

Techniques for generating recommendations based on the predicted performance of an execution plan are disclosed. A system predicts the future characteristics of a set of data objects associated with a set of structured query language (SQL) statements. The system predicts how the changes to the set of data objects will result in changes to a query execution plan associated with the SQL statements. The system predicts a set of performance metrics for the changed query execution plan. Based on the predicted performance, the system generates recommendations for modifying data, applications, or database server operations to improve performance.

17 Claims, 6 Drawing Sheets

GENERATING RECOMMENDATIONS BASED ON PREDICTED QUERY EXECUTION PLAN PERFORMANCE

TECHNICAL FIELD

The present disclosure relates to structured query language (SQL) queries and execution plans. In particular, the present disclosure relates to generating recommendations for modifying data or system operations based on predicted changes to query execution plans.

BACKGROUND

A query execution plan is a set of steps that a database management system (DBMS) follows to execute a query. When a user submits an SQL query to a database, the DBMS analyzes the query and determines the most efficient way to retrieve the requested data. The result is a plan that outlines the sequence of operations the database engine will perform to satisfy the query.

The query execution plan includes details such as the order in which tables are accessed, the types of join operations performed, the use of indexes, and other optimization strategies employed by the database optimizer. The goal is to minimize the time and resources required to execute the query and retrieve the results.

Database administrators and developers often examine query execution plans to optimize the performance of their queries. Database administrators can identify potential bottlenecks, inefficient operations, or missing indexes, and make adjustments to enhance the overall efficiency of the database queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
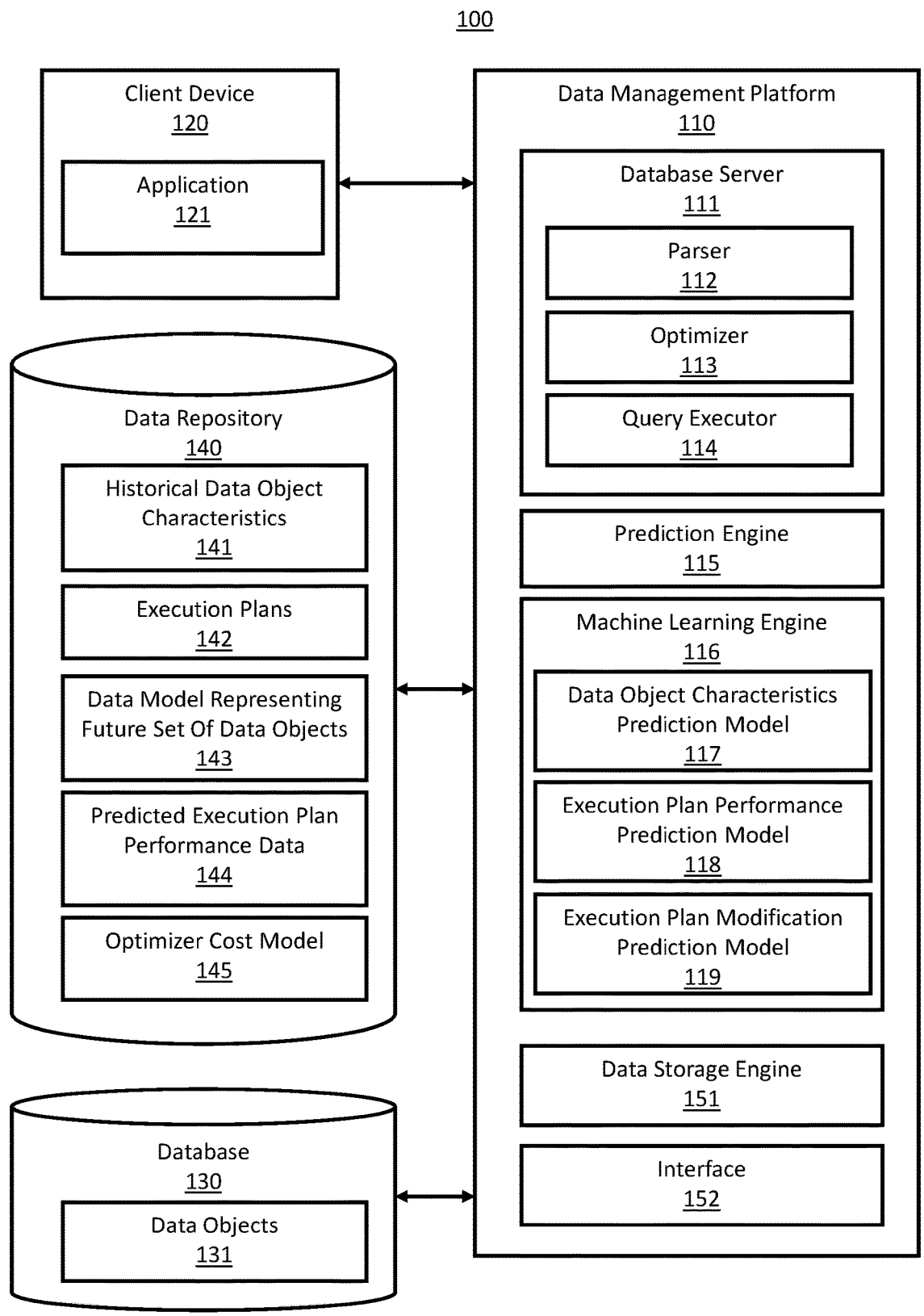
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DATABASE QUERY SYSTEM ARCHITECTURE
3. GENERATING RECOMMENDATION BASED ON PREDICTED QUERY EXECUTION PLAN PERFORMANCE
4. TRAINING A MACHINE LEARNING MODEL TO PREDICT QUERY EXECUTION PLAN PERFORMANCE CONTRIBUTIONS
5. EXAMPLE EMBODIMENT
6. COMPUTER NETWORKS AND CLOUD NETWORKS
7. HARDWARE OVERVIEW
8. MISCELLANEOUS; EXTENSIONS

1. GENERAL OVERVIEW

A DBMS generates a query execution plan for an SQL statement based at least in part on the characteristics of a target dataset. The query execution plan may be based, for example, on data distribution and statistics associated with the target dataset. In some cases, the same SQL statement may be periodically executed over time for a target dataset. If the characteristics of the target dataset change over time, the DBMS may generate different query execution plans for that same SQL statement over time. The different query execution plans may have different respective performance characteristics.

One or more embodiments predict the performance of query execution plan(s) based on the future, predicted characteristics of a target dataset. Initially, the system predicts future characteristics of the target dataset based on historical trends and statistics corresponding to the target dataset. Alternatively, or additionally, the system may predict future characteristics of the target dataset based on known or expected future events corresponding to the target dataset. The system may, for example, predict changes in the size of data objects, changes in the number of data objects that would be associated with an SQL statement, changes in the types of objects, and changes in the data stored in the objects. Based on the future characteristics of the target dataset and an SQL statement to be executed on the target dataset in the future, the system predicts characteristics of a future query execution plan that may be generated by the DBMS for the target dataset in the future. The predicted characteristics of the target dataset and the predicted characteristics of a future query execution plan (that depend on the predicted characteristics of the target dataset) are then used to predict performance of the future query execution plan.

One or more embodiments generate alerts and/or recommendations based on the predicted performance of the future query execution plan. For example, the system may recommend modifying data objects to improve the performance of the future execution plan. As another example, the system may recommend modifying the operations performed by the applications generating the SQL statements. As yet another example, the system may recommend modifying a cost model used by the query optimizer to generate execution plans. The system may recommend a modification to a process that is used for generating execution plans.

One or more embodiments apply a time-series type machine learning model to predict the future data object characteristics. The system trains the time-series model using historical data object characteristics data. The system applies the trained model to a set of time-series object characteristics data to predict future object characteristics. For example, the model may predict a growth pattern including an increase in the number of tables among the set of data objects.

One or more embodiments described in this Specification and/or recited in the claims may not be included in this General Overview section.

2. DATABASE QUERY SYSTEM ARCHITECTURE

FIG. 1 illustrates a system 100 in accordance with one or more embodiments. As illustrated in FIG. 1, system 100 includes a data management platform 110, a client device 120, a database 130, and a data repository 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The data management platform 110 receives from an application 121 executing on the client device 120 an instruction associated with a set of records stored in data objects 131 the database 130. The data management platform 110 includes a database server 111 to manage queries to the database 130. The database server 111 processes requests by clients, including the application 121, to access the database 130.

The application 121 interacts with the database server 111 by submitting to the database server 111 instructions that cause the database server 111 to perform operations on data stored in the database 130. For example, the application 121 may generate a database statement that conforms to a database language supported by the database server 111. According to one embodiment, the application 121 generates an SQL-type database statement.

The database 130 includes data and metadata stored on one or more memory devices such as on a set of hard disks. The database 130 stores the data and metadata according to a particular structure. According to one example, the database 130 stores data and metadata as a relational database construct. According to another example, the database 130 stores the data and metadata as an object-oriented database construct. In an embodiment in which the database 130 stores data in an object-oriented structure, one data structure is referred to as an object class, records are referred to as objects, and fields are referred to as attributes. In an embodiment in which the database 130 is a relational-type database, one data structure is referred to as a table, records are referred to as rows of the tables, and fields are referred to as columns. For example, the data objects 131 may include sets of tables and indexes referencing the tables. While examples of database structures and languages are provided for purposes of description, embodiments are not limited to any single type of database structure or language.

The database server 111 includes a query parser 112, a query optimizer 113, and a query executor 114. The query parser 112 receives a query statement from the application 121 and generates an internal query representation of the query statement. According to an embodiment, the internal query representation represents different components and structures of a query statement. For example, the internal query representation may be represented as a graph of nodes. The internal representation is typically generated in memory for evaluation, manipulation, and transformation by a query optimizer 113.

The query optimizer 113 evaluates the internal query representation to generate a set of candidate query execution plans for executing a query or set of queries. The query optimizer 113 may select a query execution plan for executing a query from among a set of stored query execution plans 142. In addition, if the query optimizer 113 determines the stored query execution plans 142 do not meet query execution criteria, the query optimizer 113 may generate and store a new query execution plan. Query execution plans specify an order in which execution plan operations are performed and how data flows between each of the execution plan operations. Execution plan operations include, for example, a table scan, an index scan, hash-join, sort-merge join, nested-loop join, and filter.

Query execution plans (also referred to herein as SQL execution plans) include logical query execution plans (also referred to herein as logical plans) and physical query execution plans (also referred herein as physical plans or physical execution plans). The logical plans are abstract representations of the most basic elements of a query execution process. The logical plans specify a set of tables and a set of join operations to join the tables. As defined herein, logical plans exclude additional operations and any order for performing the join operations. For example, a set of queries corresponding to a set of SQL statements may require data from six tables joined by the same five joins. A logical plan identifies the tables reached and how they join. In one or more embodiments, the logical plan does not specify how join operations occur, an order in which join operations occur, or how a table is reached (such as whether by an index or a full table scan).

According to one embodiment, a logical plan may be represented as a join tree. The apex of the join tree is a child table which uniquely joins to one or more parent tables. The parent tables may uniquely join to one or more additional tables. In the logical plan, the order in which the parent tables are listed is irrelevant, since logical plans as defined herein do not specify an order for performing join operations.

The physical query execution plans identify how the logical plan will be executed on physical data structures. The physical plans specify operations, algorithms, and access methods that are implemented on the actual data stored in a database. The physical plans specify physical stored structures, including particular indexes, tables (including particular columns and partitions in the tables), and hardware resources. For example, a logical plan may specify a join operation to join two tables. The tables may each include a different number of partitions located on different nodes of a database cluster. The logical plan identifies the tables and the join operation. The logical plan does not identify the different partitions. The logical plan does not specify an order for accessing data in the different partitions. The physical plan identifies how the join operation will be executed across multiple partitions stored in different physical memory locations. Based on the logical plan, together with available indexes and the current table and index statistics, a query optimizer 113 generates a set of strategies to reach each table and to execute the join operations. The query optimizer 113 calculates a cost for each strategy. For example, the query optimizer 113 may calculate an estimated execution time and processing resources required to execute each strategy. Accessing data from different partitions of the table in different orders may result in different query costs. The query optimizer 113 compares the estimated costs for the strategies to a cost model. Based on the comparison, the query optimizer 113 selects a particular query execution strategy as a physical plan to implement the join operation.

The query optimizer 113 selects a physical query execution plan for executing a set of queries by applying a cost model 145. The cost model 145 assigns different numerical weights to different types of operations and to resource usage. As a simple example, executing a set of queries may involve a tradeoff between processor usage and query execution times. Applying more processors to executing the query may reduce the execution time. However, in a system whose processing resources are limited, the system may assign a weight to resource usage costs that results in a longer query execution time than would be possible if more resources were assigned to executing the query. Accordingly, the query optimizer 113 applies the cost model 145 to "optimize" the execution of queries according to a set of pre-defined cost parameters.

The query executor 114 applies a selected physical execution plan to identify and carry out the particular operations on particular data objects. The query executor 114 interacts with a data storage engine 151 to access the data objects 131 stored in the database 130. The query executor 114 executes table scans, index lookups, joins, and other operations. The query executor 114 applies filtering conditions and processing aggregations. The query executor 114 manages concurrent processes and transactional aspects of the data access, modification, and retrieval.

In one embodiment, the application 121 transmits to the database server 111 a request, including a database statement, which corresponds to at least one of (a) a set of records stored in the database 130 and (b) a particular function to be applied to the set of records. The parser 112 parses the database statement to identify the query terms corresponding to the set of records and the particular function. The optimizer 113 generates or selects a physical execution plan based on the internal query representation generated by the parser 112 to access the records among the data objects 131.

A prediction engine 115 generates a set of predictions associated with changes in characteristics of the data objects 131. For example, the prediction engine 115 predicts changes in data object characteristics. Examples of data object characteristics include a number of data objects 131 in the database 130, a size of the data objects 131 (e.g., more or fewer columns or rows), types of data objects 131, a quantity of data stored in the data objects 131, types of data stored in the data objects 131, and connections between data objects 131 (such as a field of a data object referring to a field of another data object in a referential database).

According to one embodiment, the prediction engine 115 applies a data object characteristics prediction model 117 to historical data object characteristics data 141 to predict a set of future data object characteristics. In one embodiment, the machine learning model is a time-series type model based on autoregressive moving average values. Examples include an Autoregressive Integrated Moving Average (ARIMA)-type model, a Seasonal ARIMA (SARIMA)-type model, and a seasonal ARIMA model with exogenous variables (SARIMAX). According to another embodiment, the machine learning model is an exponential smoothing state space model, such as a Holt-Winters Exponential Smoothing (HES) model or a Trigonometric Seasonality Box-Cox ARMA Trend and Seasonal (TBATS) model. According to one embodiment, the system selects one model from the above set of models to apply to a set of time-series data object characteristics data based on identified features in the data, such as stationarity and seasonality. According to one or more alternative embodiments, the data object characteristics prediction model 117 is a long short-term memory network (LSTM) model, a gated recurrent unit (GRU) network model, or a convolutional neural network (CNN) model.

The prediction engine 115 predicts if a set of predicted future data object characteristics corresponds to a modified execution plan. According to one example embodiment, predicting whether the set of predicted future data object characteristics corresponds to the modified execution plan entails providing the predicted future data object characteristics and a set of SQL statements to the query optimizer 113 to generate a physical execution plan. If the prediction engine 115 determines the predicted physical execution plan differs from a current execution plan for the same set of SQL statements, the prediction engine 115 predicts that the predicted future data object characteristics would correspond to a modified physical execution plan.

The prediction engine 115 predicts the performance of a future execution plan, based on the predicted future data object characteristics. According to one embodiment, the prediction engine 115 generates a data model 143 that represents a future set of data objects based on the predicted future data object characteristics. For example, the data model 143 may include more data objects, larger data objects, and different types of data objects than the current data objects 131. The data model 143 may include representations of a predicted future set of data objects without storing actual data in data objects in the model. For example, instead of storing data, the data model 143 may store values representative of a predicted amount of data and types of data stored in a data object. The model 143 stores values representing the number and type of data objects, sizes of the data objects, and types of data stored in the data objects. Generating the prediction of the performance of the future execution plan may include applying a future physical execution plan to the data model 143. The query executor 114 may perform the operations specified in the future physical execution plan to retrieve data without actually accessing and transmitting stored data. For each operation, the prediction engine 115 may estimate a time that would be required to execute the operation by accessing and transferring data.

According to an alternative embodiment, the prediction engine applies the future execution plan to a trained execution plan performance prediction machine learning model to predict the future performance of the future execution plan. The execution plan may include either a logical plan for a query or a physical query execution plan. According to one example, the machine learning engine 116 may train a neural network type machine learning model with execution plans as input data and performance metrics as output data. Performance metrics may include, for example, resources (e.g., CPU, I/O, and memory) utilized during execution of the future execution plan and a time required to execute the future execution plan. The system stores the predicted performance of the future execution plan as predicted execution plan performance data 144.

The prediction engine 115 generates a prediction indicating to what degree different features, among a set of future data object characteristics and future execution plan characteristics, contribute to the performance of the execution plan. For example, the prediction engine 115 may apply an execution plan modification prediction model 119 to a set of data, including the set of future data object characteristics and the future execution plan characteristics. According to one embodiment, the execution plan modification prediction model 119 is a trained neural network. The neural network may be trained to identify relationships among query operations, data objects, and performance metrics. The neural network may generate a set of output values specifying one or more contributors that the model predicts have the greatest influence on the query execution plan not meeting the performance criteria. As an example, a modified execution plan may include additional operations to join one or more tables that are predicted to be present in the future set of data objects but that are not present in the current set of data objects. The modified execution plan may include additional operations to perform an index lookup to an index that is predicted to be in the future set of data objects but that is not among the current set of data objects. The modified execution plan may include more data modification operations of data in the future set of data objects than in the current set of data objects. A predicted set of future data object characteristics may include an increased number of data objects, an increased size of the data objects, and an increase in a number of indexes referencing the data objects. A human may be incapable of determining, from among the many variables between the current set of data objects and execution plan and the predicted future set of data objects and execution plan, that variables contribute the most to the predicted future query execution failing to meet performance criteria. For example, the system may predict that the future execution plan would exceed a query execution time. However, a human user may be incapable of determining the factor(s), from among the additional query operations, the size of the data, and the number of data objects, that would have the greatest influence on the increased query execution time. For example, adding an index to reference a set of tables may result in a query execution plan that adds an index lookup operation that may add time to a query. However, the time added by the index lookup operation may be less time than it would take the query executor to execute the query without the index lookup. While a human cannot determine the factor(s) having the greatest influence on the increased query execution time, a trained neural network type model may identify and rank the greatest contributors to an increased query execution time for a particular query execution plan. The ranking may be as follows, for example: (1) an increase in the number of join operations, (2) an increase in the number of data objects, and (3) an increase in the size of the data objects. Based on the output from the machine learning model 119, for a particular future query execution plan, the data management platform 110 may prioritize reducing the number of data objects over reducing a size of the data objects to improve query execution performance.

In some examples, one or more elements of the machine learning engine 116 may use a machine learning algorithm to train one or more machine learning models. The machine learning engine 116 may use a first machine learning algorithm to train the data object characteristics prediction model 117. The first machine learning algorithm may be a time-series-type algorithm such as an ARIMA-type algorithm. The machine learning engine 116 may use a second machine learning algorithm to train the execution plan performance prediction model 118. The machine learning engine 116 may use a third machine learning algorithm to train the execution plan modification prediction model 119. In one embodiment, both the second machine learning algorithm and the third machine learning algorithm correspond to neural-network type machine learning models. A machine learning algorithm is an algorithm that can be iterated to learn a target model f that best maps a set of input variables to an output variable using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables of the target model f. For example, a set of input variables associated with the datasets for the data object characteristics prediction model 117 include historical data object characteristics. Input variables associated with the execution plan performance prediction model 118 may include historical logical and physical execution plans, result set summaries, and performance metrics. Result set summaries include, for example, result set counts (e.g., a number of rows or columns returned) and/or result set hash values. Input variables associated with the execution plan modification prediction model 119 may also include logical and physical execution plans and performance metrics associated with the execution plans. The associated labels are associated with the output variable of the target model f. For example, an output variable associated with the datasets for the data object characteristics prediction model 117 may include predicted future data object characteristics. An output variable associated with the execution plan performance prediction model 118 may include predicted performance metrics. An output variable associated with the execution plan modification prediction model 119 may also include a ranking of features (e.g., data object characteristics, execution plan characteristics, and cost model characteristics). The training data may be updated based on, for example, feedback on the accuracy of the current target model f. Updated training data is fed back into the machine learning algorithm that in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn relationships among data object characteristics, execution plan characteristics, and execution plan performance metrics.

In accordance with an embodiment, the machine learning engine 116 includes a training module. The training model manages the 'learning' process of machine learning models by implementing various learning algorithms that enable models to identify patterns and make predictions or decisions based on input data. In an embodiment, the training process begins with the preparation of the dataset after preprocessing; this involves splitting the data into training and validation sets. The training set is used to teach the model, while the validation set is used to evaluate its performance and adjust parameters accordingly. The training module handles the iterative process of feeding the training data into the model, adjusting the model's internal parameters (such as weights in neural networks) through backpropagation and optimization algorithms, such as stochastic gradient descent or other algorithms providing similarly useful results.

In accordance with an embodiment, training module manages overfitting, where a model learns the training data too well, including its noise and outliers, at the expense of its ability to generalize to new data. Techniques such as regularization, dropout (in neural networks), and early stopping are implemented to mitigate this. Additionally, the module employs various techniques for hyperparameter tuning; this involves adjusting model parameters that are not directly learned from the training process, such as learning rate, the number of layers in a neural network, or the number of trees in a random forest.

In an embodiment, the training module includes logic to handle different types of data and learning tasks. For instance, it includes different training routines for supervised learning (where the training data comes with labels) and unsupervised learning (without labeled data). In the case of deep learning models, the training module also manages the complexities of training neural networks that include initializing network weights, choosing activation functions, and setting up neural network layers.

In an embodiment, the machine learning engine 116 includes an evaluation and tuning module. The evaluation and tuning module incorporates dynamic feedback mechanisms and facilitates continuous model evolution to help ensure the system's relevance and accuracy as the data landscape changes. The evaluation and tuning module conducts a detailed evaluation of a model's performance. This process involves using statistical methods and a variety of performance metrics to analyze the model's predictions against a validation dataset. The validation dataset, distinct from the training set, is instrumental in assessing the model's predictive accuracy and its capacity to generalize beyond the training data. The module's algorithms meticulously dissect the model's output, uncovering biases, variances, and the overall effectiveness of the model in capturing the underlying patterns of the data.

In an embodiment, the evaluation and tuning module performs continuous model tuning by using hyperparameter optimization. The evaluation and tuning module performs an exploration of the hyperparameter space using algorithms, such as grid search, random search, or more sophisticated methods like Bayesian optimization. The evaluation and tuning module uses these algorithms to iteratively adjust and refine the model's hyperparameters—settings that govern the model's learning process but are not directly learned from the data—to enhance the model's performance. This tuning process helps to balance the model's complexity with its ability to generalize and attempts to avoid the pitfalls of underfitting or overfitting.

In an embodiment, the evaluation and tuning module integrates data feedback and updates the model. The evaluation and tuning module actively collects feedback from the model's real-world applications, an indicator of the model's performance in practical scenarios. Such feedback can come from various sources depending on the nature of the application. For example, in a database management system, feedback might comprise particular weights assigned to elements of a cost model applied by a query optimizer to generate a physical query execution plan. Other feedback may include particular remediation actions, such as modifying applications generating SQL statements and modifying data objects.

In an embodiment, feedback integration logic within evaluation and tuning module integrates this feedback using a process of assimilating new data patterns, user interactions, and error trends into the system's knowledge base. The feedback integration logic uses this information to identify shifts in data trends or emergent patterns that were not present or inadequately represented in the original training dataset. Based on this analysis, the module triggers a retraining or updating cycle for the model. If the feedback suggests minor deviations or incremental changes in data patterns, the feedback integration logic may employ incremental learning strategies, fine-tuning the model with the new data while retaining its previously learned knowledge. In cases where the feedback indicates significant shifts or the emergence of new patterns, a more comprehensive model updating process may be initiated. This process might involve revisiting the model selection process, re-evaluating the suitability of the current model architecture, and/or potentially exploring alternative models or configurations that are more attuned to the new data.

In accordance with an embodiment, throughout this iterative process of feedback integration and model updating, the evaluation and tuning module employs version control mechanisms to track changes, modifications, and the evolution of the model, facilitating transparency and allowing for rollback if necessary. This continuous learning and adaptation cycle, driven by real-world data and feedback, helps to endure the model's ongoing effectiveness, relevance, and accuracy.

Additional embodiments and/or examples relating to computer networks are described below in Section 6, titled "Computer Networks and Cloud Networks."

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or executed on the same computing system as the data management platform 110. Additionally, or alternatively, a data repository 140 may be implemented or executed on a computing system separate from the data management platform 110. The data repository 140 may be communicatively coupled to the data management platform 110 via a direct connection or via a network.

Information describing historical data object characteristics 141, execution plans 142, the data model representing a future set of data objects 143, predicted execution plan performance data 144, and optimizer cost models 145 may be implemented across any of components within the system 100. However, this information is illustrated within the data repository 140 for purposes of clarity and explanation.

In one or more embodiments, the data management platform refers to hardware and/or software configured to perform operations described herein for generating recommendations based on modifications to query execution plans. Examples of operations for generating recommendations based on modifications to query execution plans are described below with reference to FIGS. 2A and 2B.

In an embodiment, the data management platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 152 refers to hardware and/or software configured to facilitate communications between a user and the database server 111. Interface 152 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 152 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 152 is specified in one or more other languages, such as Java, C, or C++.

3. GENERATING RECOMMENDATION BASED ON PREDICTED QUERY EXECUTION PLAN PERFORMANCE

Figure 2A:
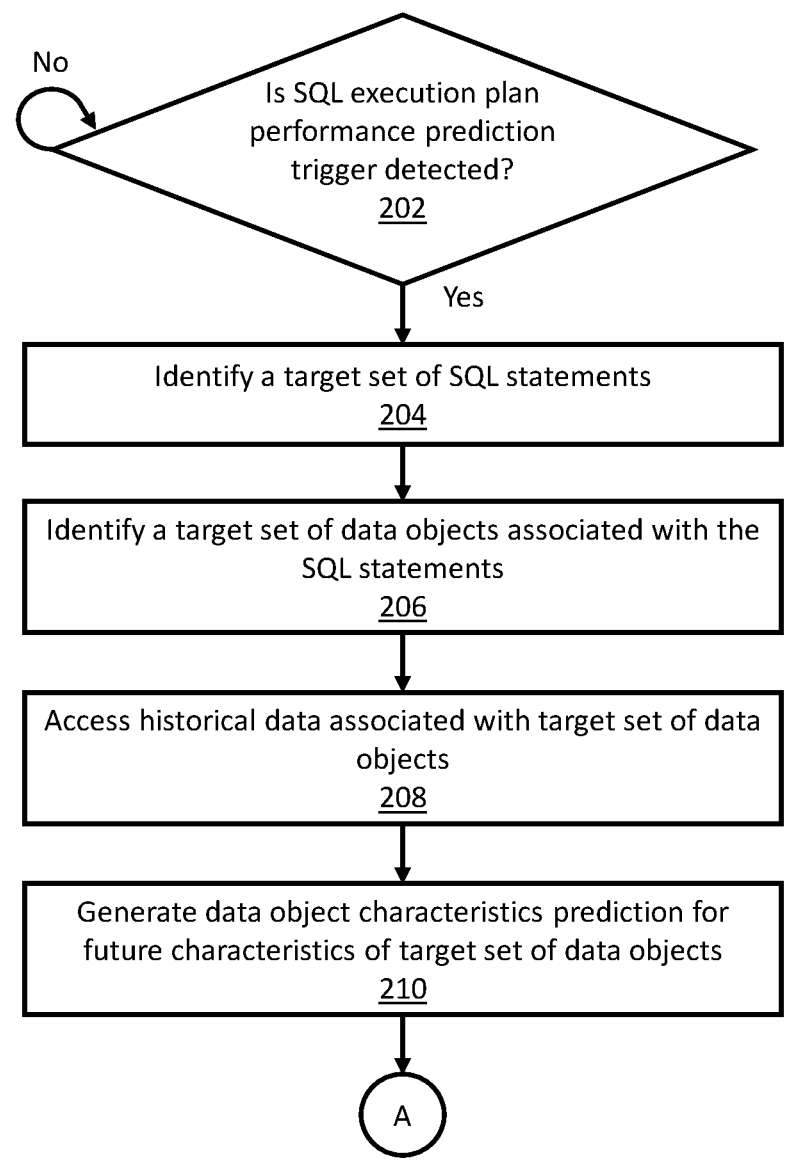
FIGS. 2A and 2B illustrate an example set of operations for generating recommendations based on predicted changes to query execution plans in accordance with one or more embodiments.
Figure 2B:
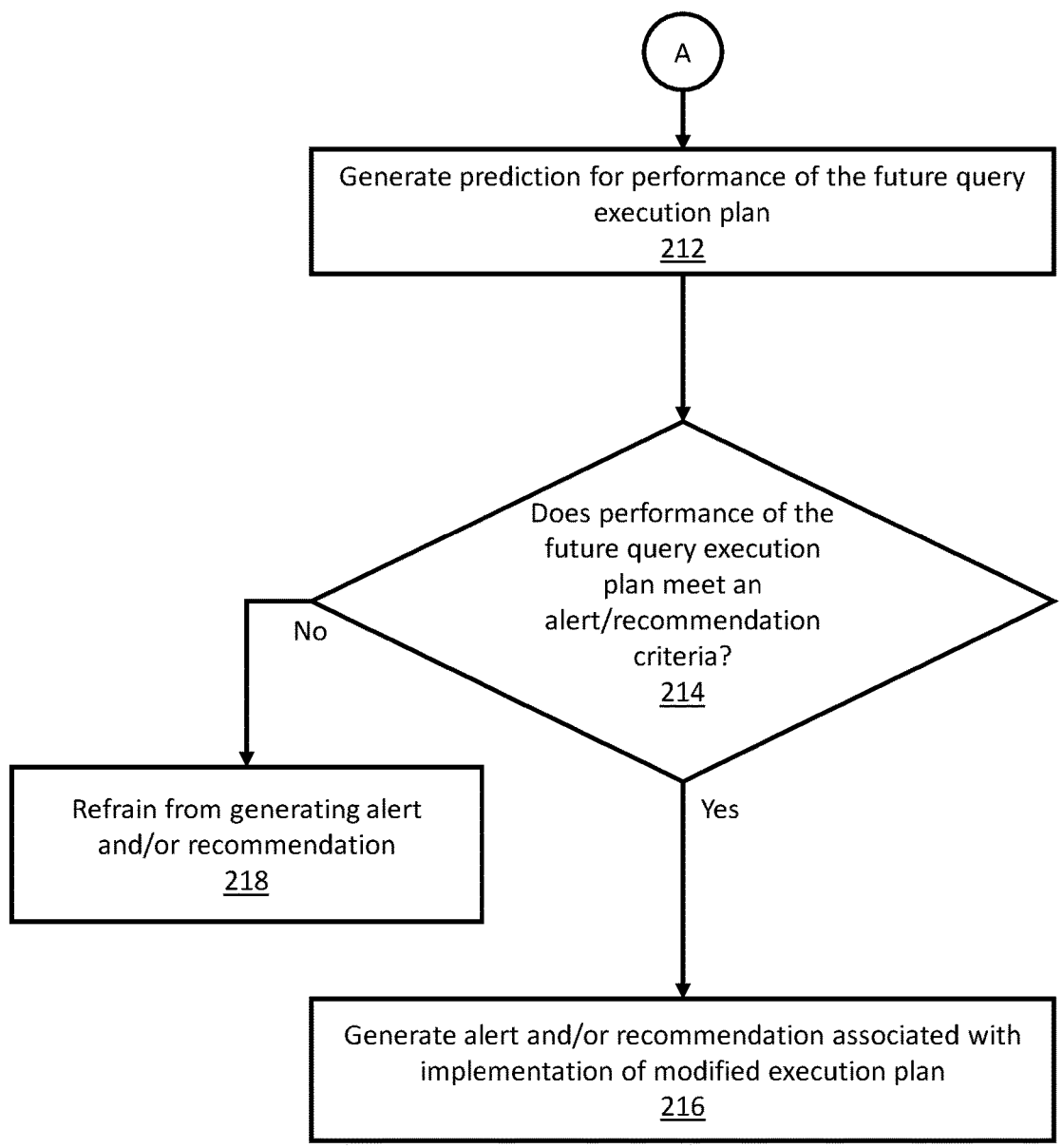

FIGS. 2A and 2B illustrate an example set of operations for predicting the performance of future query execution plans in accordance with one or more embodiments. One or more operations illustrated in FIGS. 2A and 2B may be modified, rearranged, or omitted. Accordingly, the sequence of operations illustrated in FIGS. 2A and 2B should not be construed as limiting the scope of one or more embodiments.

A system determines if a triggering event has been detected for predicting future characteristics of data objects stored in a data store (Operation 202). The data objects include objects, such as tables and indexes. The data objects may be stored in a database and accessed by a database server. Triggers for predicting future data object characteristics may include user-initiated triggers and programmed or scheduled triggers. For example, a system may be configured to generate predictions on a regular basis. Based on the regularly scheduled predictions, a system may present clients with estimates of expected data usage and storage requirements. According to another example, a trigger may include an instruction received from an application to initiate one or more predictions. The instruction may be in response to a user interaction with the application. For example, a user may select a user interface element in a graphical user interface of a database management platform to "Estimate data storage requirements in [specify future time period]". Alternatively, the instruction may be in response to an application detecting a preprogrammed trigger. Example triggers include the following: detecting a particular rate of change of data requests by an application to a database, detecting query response times that exceed a query response threshold, detecting changes in query response times that exceed the query response rate-of-change threshold, detecting a number of data objects in a data store that exceeds a data object threshold, and detecting a rate of change of data objects in the data store that exceeds a data object rate-of-change threshold.

As an example, a system may detect a doubling in a number of data objects stored in a data store and accessed by a particular set of applications over a period of three months. The system may store a threshold value of a 20% rate-of-change. Based on the threshold, if a number of data objects accessed by an entity in a datastore increases by more than 20% over a three-month period, the system initiates a data object prediction process. As another example, the system may detect that the time required to execute query requests initiated by an application has increased by 50% over a one-month period of time. The system may store a threshold value of 30%. Based on the threshold, if the time required to execute query requests initiated by an application over a one-month period of time exceeds 30%, the system initiates a data object prediction process.

Based on detecting the data object prediction trigger in Operation 202, the system identifies a set of SQL statements to identify a corresponding set of data objects (Operation 204). For example, the system may identify a set of applications associated with a particular entity. The system may identify the set of SQL statements generated by the applications to access a database. Alternatively, the system may identify the SQL statements as being based on a middle tier application between an application and a database server. The application may generate a request, and the application may translate the request into a set of SQL statements.

As a particular example, a company may run a set of applications that make data requests to a database. The applications may be utilized by a large number of employees and customers. The system may identify every application used by the company to make requests to access data in the database. The system may select a set of SQL statements for identifying a corresponding set of data objects in the database based on the data requests initiated by the company's applications.

The system may select a set of SQL statements based on predefined criteria. The criteria may include one or more of the following or any combination of the following: the most frequently-executed SQL statements, the most recently executed SQL statements, SQL statements that correspond to the longest query response times, SQL statements that access the highest number of data objects, SQL statements that consume the most processing resources to execute, and a random selection of a predefined percentage of SQL statements.

The system identifies a set of target data objects associated with the set of SQL statements (Operation 206). The set of target data objects may include, for example, every data object accessed by the set of SQL statements. In other words, the system may analyze the executed SQL statements to identify each data object accessed by a database management system (DBMS) executing queries to the database using the SQL statements. Alternatively, the set of target data objects may include a subset of the entire data set of objects in a database accessed based on the set of SQL statements. For example, the subset of data objects may include the data objects accessed more than a threshold number of times, such as two times, over a predefined period of time, such as a month.

According to one or more embodiments, the system selects a set of data objects for generating a set of predictions based on identifying a set of SQL statements that have accessed or referenced the data objects. The set of predictions may include predictions regarding the future state of the set of data objects. The set of predictions may further include predictions regarding future states of logical and/or physical execution plans for executing queries to a database storing the data objects. The system may apply predefined rules to filter the set of target SQL statements and the target data objects. For example, an enterprise may host a suite of applications that result in executing thousands of SQL statements. The system may filter the SQL statements to identify a representative sample of 30% of the SQL statements. The system may filter the SQL statements by applying thresholds, including a number of times an SQL statement is executed within a particular period of time and the amount of time required to execute a query corresponding to the SQL statement. The filtering of the data objects may alter the resulting predictions associated with future data objects and future modifications to logical and/or physical execution plans.

The system accesses historical information of data objects identified in SQL statements (Operation 208). When an application generates SQL statements to execute queries on a database, the system may store query data, including the following: a number of data objects associated with the query, a number of indexes accessed to execute the query, the size (e.g., the number of rows and/or columns) of tables associated with the query, amount of data stored in a table, operations performed on data, filters applied to the data, a type of data object accessed, a type of data accessed, and an execution time associated with the query. In one embodiment, the system stores the SQL statement execution data as log files. The log files may represent queries with query identifiers. The query identifiers may be mapped to a particular query. In addition, operations performed on queried data may be stored as identifiers. Similarly, particular tables may be stored as identifiers. Accordingly, query execution data may be encoded with a set of identifiers representing characteristics of the query, including tables accessed, data types returned, an amount of data returned, a time required to execute the query, and operations performed on returned data.

According to one embodiment, the system obtains historical time-series data containing data object metrics collected from a data store. The system may obtain the historical time-series data for a given set of data objects corresponding to the identified SQL statements. Each record in the time-series data may include a set of values for a set of metrics (such as a number of data objects, a number of rows and/or columns in the data objects, a number of data entries, types of data objects, etc.), a timestamp representing the time when the set of metrics was generated, and/or an index representing the position of the value in the time series.

The system generates a prediction of the future characteristics of the set of data objects (Operation 210). For example, the system may predict a change in a number of tables in a database, a change in a size of the tables (e.g., more or fewer columns or rows), a change in the types of tables, a change in a quantity of data stored in the tables, a change in the types of data stored in the tables, and a change in connections between tables (such as a field of a table referring to a field of another table in a referential database). For example, the system may predict that a set of tables will increase in both a number of columns and rows as a number of customers increases and as a number of recorded attributes associated with the customers increases. The system may further predict that the types of data objects will change to include both tables storing customer data and indexes storing metadata regarding the relationships between tables. The system may further predict that the number of join operations between tables will increase. In other words, a particular table associated with customer data will be joined to an increased number of additional tables as the number of recorded customer attributes increases. The system may further predict that the overall amount of data stored in a set of tables will increase as more customers are added to the tables.

The system applies a machine learning model to the historical time-series data for a given set of data objects to generate the prediction. The training data for the machine learning model may include a subset of the historical time-series data for the set of data objects. For example, in one embodiment, the machine learning model is a time-series type model based on autoregressive moving average values. Examples include an Autoregressive Integrated Moving Average (ARIMA)-type model, a Seasonal ARIMA (SARIMA)-type model, and a seasonal ARIMA model with exogenous variables (SARIMAX). According to another embodiment, the machine learning model is an exponential smoothing state space model, such as a Holt-Winters Exponential Smoothing (HES) model or a Trigonometric Seasonality Box-Cox ARMA Trend and Seasonal (TBATS) model. According to one embodiment, the system selects the model, from among the above set of models, to apply to a set of time-series data object characteristics data based on identified features in the data, such as stationarity and seasonality.

According to one example embodiment, the system trains at least one time-series model to the historical data object characteristics data to generate a data object characteristics prediction model. In the example where the data object characteristics prediction model is an ARIMA model, the system creates the ARIMA-type model by generating a set of training data from the historical data object characteristics data. The system plots the historical data object characteristics time series data to identify characteristics, such as seasonality, trends, and other patterns, in the data. According to one example, the system determines that the historical data object characteristics data is stationary or in other words has a constant mean and variance over time. If the system determines that the historical data object characteristics data is not stationary, the system may apply a differencing process to convert the non-stationary data to stationary data.

The system identifies values for the parameters of the ARIMA model. In particular, the system identifies values for parameters d, p, and q. The parameter d represents an order of differencing required to make the data stationary. If the system determines that the data is not stationary, the system performs a differencing operation and checks for stationarity again. The system iteratively applies differencing and checks for stationarity until the system determines the data is stationary. The value d represents the number of times the system performed differencing and checking for stationarity.

The parameter p represents an autoregressive order. The system determines the autoregressive order p by analyzing an autocorrelation function (ACF) plot. The autoregressive order p is based on significant lags beyond which autocorrelation values are not statistically significant. For example, using an autocorrelation function, a set of time-series data is copied, and the copy is adjusted to lag the original set of time-series data. By comparing the original set of time-series data with multiple copies having different lag times, patterns in the historical data, such as seasonality, are identified.

The parameter q represents a moving average order of the historical time-series data. The system determines the moving average order q by analyzing a partial autocorrelation function (PACF) plot. The moving average order q is based on significant lags beyond which partial autocorrelation values are not statistically significant.

According to one embodiment, the system estimates the model parameters p, d, and q using a method such as maximum likelihood estimation (MLE). The system tunes the model by fitting the model to the training data, validating the model, and evaluating performance of the model. For example, the system may evaluate the performance of the model using a mean squared error (MSE) or root mean squared error (RMSE) algorithm. Based on the evaluation, the system iteratively adjusts one or more parameters p, d, and q and re-evaluates the model.

As discussed above, in one embodiment, the system uses an ARIMA model to predict the future characteristics of the data objects based on identifying linear patterns for the changing characteristics of the data objects. According to an alternative embodiment, where the system identifies non-linear patterns for the changing characteristics of the data objects, the system applies a Seasonal ARIMA-type model.

According to one or more alternative embodiments, the system predicts future data object characteristics using a trained neural network, such as a long short-term memory network (LSTM), a gated recurrent unit (GRU) network, or a convolutional neural network (CNN). In an example whose data object characteristics prediction model is an LSTM model, the system generates training data by dividing the time-series data into windows of historical data. For example, one window corresponds to a particular time period such as one day. The target for the model is the next value in the time series succeeding the window. The system trains the LSTM model to receive a sequence (T1, T2, T3) as input data and predict a value (T4) as output data. The system may sequentially input sequences (e.g., T1-T3, T2-T4, T3-T5) to predict corresponding sequential output values (T4, T5, T6). The system trains the LSTM model using the training dataset to capture patterns and dependencies in the historical sequences to predict the next values. The system adjusts the number of epochs, batch size, and other hyperparameters to optimize training. In operation, the system inputs to the LSTM model a sequence of input data, corresponding to historical object characteristics over a defined number of periods of time. The LSTM model predicts the characteristics of a predicted future set of objects for a future period of time.

The system predicts the performance of the future execution plan based on the predicted future data objects (Operation 212). According to one embodiment, the system generates a data model of a set of stored data objects based on the predicted future data object characteristics. The data model may include table identifiers for different tables and indexes without storing the actual data contained within the tables. Predicting the performance of the future execution plan may include applying a predicted future physical execution plan to the data model of the set of stored data objects. This identifies the operations specified in the predicted future physical execution plan. The system estimates the time and resources required to execute the predicted future physical execution plan on the predicted future data objects represented by the data model.

According to an alternative embodiment, the system applies the future execution plan to a trained machine learning model to predict the future performance of the future execution plan. For example, the system may train a neural network type machine learning model with logical and/or physical execution plans as input data and performance metrics as output data. Performance metrics may include resources (e.g., CPU, I/O, and memory) utilized during execution of the future execution plan and a time required to execute the future execution plan. The system stores the predicted performance of the execution plan. In one or more embodiments, the system predicts the performance of the future execution plan based on a historical result set summary. For example, the system may analyze historical data associated with rows returned by queries and result set hash values for queries.

According to one embodiment, the system generates the predicted performance of the future query execution plan based on determining the predicted changes to the data object characteristics would correspond to a modified execution plan for the set of SQL statements. According to an embodiment, the system provides the predicted data object characteristics and the set of SQL statements to a database server's optimizer to generate a physical execution plan for executing the SQL statements. The system compares the physical execution plan generated by the optimizer to a presently executed physical execution plan to identify changes to the physical execution plan.

In one embodiment, the optimizer generates a physical execution plan, and a query executor executes the physical execution plan. The optimizer and the query executor operate sequentially in a query processing pipeline. The optimizer is invoked first to analyze a logical plan and to optimize a physical query execution plan. The optimizer outputs the physical execution plan to the query executor for actual execution of the query. The optimizer finds the most efficient way to execute the query by considering factors such as indexes, join methods, and access paths. The optimizer evaluates a logical plan to generate a set of candidate physical execution plans for executing a query or set of queries. Physical execution plans specify an order that execution plan operations are performed and how data flows between each of the execution plan operations. Physical execution plan operations include, for example, a table scan, an index scan, hash-join, sort-merge join, nested-loop join, and filter.

The optimizer explores the search space of possible execution plans to select a particular physical execution plan for executing a set of queries. The optimizer considers different access paths, join orders, and other optimization strategies. For example, the optimizer considers factors, such as the size of tables, join conditions, and available indexes, to determine the optimal order to join tables.

The optimizer selects a physical execution plan with the lowest estimated cost to execute a set of queries. Based on the cost estimates and optimization decisions, the optimizer generates the physical execution plan. Examples of costs considered by the optimizer include central processing unit (CPU) usage, input/output (I/O) usage, and memory usage. For each operation in a query execution plan, the optimizer estimates the cost of accessing data. Examples of operations include table scans and index lookups. The optimizer may estimate several I/O operations required to perform the operation, the size of data accessed by the operation, and if relevant indexes are available to perform the operation.

The optimizer considers additional types of costs when determining the execution plan to select for executing a set of queries. Example costs include join costs, filtering and predicate costs, and sorting and grouping costs. Join costs include the costs to join tables using different algorithms, such as nested loops, hash joins, and merge joins. When analyzing filtering and predicate costs, the optimizer estimates how much data would be filtered at each step of an execution plan. For example, filtering more data early in an execution plan may have a tendency to reduce the costs of downstream operations.

An optimizer selects a physical execution plan by applying a cost model. The cost model assigns different numerical weights to different types of operations and resource usage. As a simple example, executing a set of queries may involve a tradeoff between processor usage and query execution times. Applying more processors to executing the query may reduce the execution time. However, in a system where processing resources are limited, the system may assign a weight to resource usage costs that results in a longer query execution time than would be possible if more resources were assigned to executing the query. Accordingly, the optimizer applies the cost model to "optimize" the execution of queries according to a set of pre-defined cost parameters. A system administrator may select the pre-defined cost parameters or weights based on application requirements and available system resources, such as processors, memory, and I/O hardware.

In one embodiment, the system stores a logical execution plan as a predicted future execution plan. In an alternative embodiment, the system stores a predicted future physical execution plan as the future execution plan. The system may generate the prediction of the future execution plan by providing the predicted physical execution plan generated or selected by the optimizer and the predicted future characteristics of the data objects to the query executor. The query executor applies the physical execution plan to identify and carry out the particular operations on particular data objects. For example, the query executor interacts with a data storage engine to access data. The query executor executes table scans, index lookups, joins, and other operations. The query executor applies filtering conditions and processing aggregations. The query executor manages concurrent processes and transactional aspects of the data access, modification, and retrieval.

In the embodiment illustrated in FIGS. 2A and 2B, if the system determines that predicted changes to data object characteristics do not result in a modified execution plan, the system determines that no prediction of an execution plan performance is required (Operation 214). In other words, the determination that predicted changes in data object characteristics would result in changes to an execution plan triggers a prediction of the modified execution plan performance. Conversely, the determination that the predicted changes in data object characteristics would not result in changes to an execution plan does not trigger a prediction of the modified execution plan performance. However, in an alternative embodiment, the system may still predict the execution plan performance even when predicted changes to data object characteristics would not result in a modified execution plan. For example, predicting a significant increase in the amount of data stored in a table may not result in a modified execution plan, but it may result in a degradation of a query response time. Accordingly, a user may wish to initiate a modification to an execution plan even when predicted changes to a set of data objects would not have resulted in the optimizer modifying the execution plan.

The system determines if the predicted performance for the future execution plan meets an alert and/or recommendation criteria (Operation 214). Alert and/or recommendation criteria include particular values for resources (e.g., CPU, I/O, and memory) utilized during execution of the future execution plan and a time required to execute the future execution plan. For example, a CPU usage criterion may specify that for a particular application, executing a query should consume no more than 10% of a CPU's processing capacity for the duration of the execution. As another example, a query execution time criterion may specify that for a particular set of SQL statements, a query execution and response time should be no more than 10 seconds. The system may store different alert and/or recommendation criteria for different entities accessing databases. The alert and/or recommendation criteria for one entity may specify a first execution time for executing an execution plan. The alert and/or recommendation criteria for another entity may specify a second execution time for executing the execution plan. Additionally, or alternatively, the alert and/or recommendation criteria for an entity may specify a particular CPU utilization allocated to executing an execution plan. The system may specify different alert and/or recommendation criteria for different applications, different enterprises accessing data, different users, and different databases.

As an example, a set of SQL statements associated with a current set of data objects stored in a database correspond to a first physical execution plan and a first query execution time. Based on predicted changes to the set of data objects at a future time, the system predicts that the same set of SQL statements would correspond to a modified physical execution plan and a second query execution time. The modified physical execution plan may include additional operations to join one or more tables that are predicted to be present in the future set of data objects but that are not present in the current set of data objects. The modified physical execution plan may include additional operations to perform an index lookup to an index that is predicted to be in the future set of data objects but that is not among the current set of data objects. The modified physical execution plan may include more data modification operations of data in the future set of data objects than in the current set of data objects. Accordingly, the system may predict that execution of the modified physical execution plan would take longer than execution of the first physical execution plan. In addition, the system may predict that the execution time of the modified physical execution plan would exceed a threshold execution time.

Based on determining the predicted performance for the future execution plan does meets a set of alert and/or recommendation criteria, the system generates a recommendation based on the predicted performance (Operation 216). Recommended modifications may include, for example, recommending modifications to the set of data objects, recommending modifications to database server operations, such as generation of the execution plan, and recommending modifications to applications generating SQL statements to access the data objects.

For example, a system may predict changes to a set of data objects that include increasing a number of data objects, increasing the size (e.g., columns and/or rows) of data objects, and increasing a number of indexes referencing the data objects. Recommending a modification may include recommending increasing the future size of one or more data objects and decreasing several additional data objects generated. In other words, the system may recommend that an application increase the size of the data objects instead of creating new data objects. Alternatively, recommending a modification may include recommending increasing several future data objects to decrease the size of the future data objects. Additionally, or alternatively, recommending a modification may include recommending decreasing several indexes generated to index a set of tables. Alternatively, recommending a modification may include recommending increasing the number of indexes generated to index the set of tables. Additionally, or alternatively, recommending a modification may include recommending partitioning one or more data objects. Additionally, or alternatively, recommending a modification may include recommending caching one or more data objects.

According to another example, the system may recommend a user over-ride the database server to prevent implementation of a predicted future execution plan. Additionally, or alternatively, the system may recommend that a user modify the cost model that the optimizer applies to generate or select a physical execution plan. For example, the system may determine that the weights applied by the optimizer to resource utilization and query execution time should be adjusted to re-prioritize the selection of operations to improve query execution time at the expense of resource utilization. For example, the optimizer's cost model may include a resource utilization value such that query operations would consume no more than 10% of a CPU's processing capacity for a given period of time. The system may recommend adjusting a weight assigned to resource utilization to allow query operations to consume no more than 20% of the CPU's processing capacity and give a higher priority to query execution times.

According to yet another example, the system may recommend modifying operations of applications generating SQL statements. Modifying the applications' operations may include re-scheduling certain queries to times when more computing resources are available, reducing the frequency that the applications generate the SQL statements, modifying the SQL statements to reduce the number of data objects indicated in the SQL statements, and modifying the SQL statements to reduce the number of operations performed on the data in the SQL statements.

According to yet another example, the system may recommend modifying a future physical execution plan. Modifying the future physical execution plan may include, for example, restructuring the future physical execution plan. In addition, or in the alternative, modifying the future physical execution plan may include implementing the future physical execution plan with an alternative set of access paths to access data in tables or implementing alternative join methods to join tables.

According to yet another example, the system may recommend modifying a set of SQL statements generated by an application to execute a query. Modifying the SQL statements may result in a system generating a new logical plan for the modified set of SQL statements. In one example, a system identifies performance metrics corresponding to two sets of SQL statements having two different logical plans. Based on determining that modifications to the first set of SQL statements corresponds to a higher performance improvement than modifications to the second set of SQL statements, the system selects the first set of SQL statements for tuning. Examples of tuning modification include modifying filtering or aggregating operations specified in the SQL statements. For example, the system may determine that execution of a query corresponds to a large amount of data being retrieved. The system may determine that a portion of the retrieved data is not usable by the requesting application. The system may recommend tuning the SQL statements to further filter the query results, thereby reducing computation resources utilized to execute the query.

According to one embodiment, the system applies a trained machine learning model to the predicted performance metrics and to the future execution plan. The machine learning model identifies one or more contributing factors that contributed most to the failure of the future execution plan to meet the performance criteria. For example, the trained machine learning model may be a ranking-type neural network. The neural network may be trained to identify relationships among query operations, data objects, and performance metrics. The neural network may generate a set of output values specifying one or more contributors that the model predicts have the greatest influence on the query execution plan not meeting the performance criteria. As an example, a modified execution plan may include additional operations to join one or more tables that are predicted to be present in the future set of data objects but that are not present in the current set of data objects. The modified execution plan may include additional operations to perform an index lookup to an index that is predicted to be in the future set of data objects but that is not among the current set of data objects. The modified execution plan may include more data modification operations of data in the future set of data objects than in the current set of data objects. A predicted set of future data object characteristics may include an increased number of data objects, an increased size of the data objects, and an increase in a number of indexes referencing the data objects. A human may be incapable of determining, from among the many variables between the current set of data objects and execution plan and the predicted future set of data objects and execution plan, which variables contribute the most to the predicted future query execution failing to meet performance criteria. For example, the system may predict that the future execution plan would exceed a query execution time. However, a human user may be incapable of determining the factor(s), from among the additional query operations, the size of the data, and the number of data objects, that would have the greatest influence on the increased query execution time. For example, the addition of an index to reference a set of tables may result in a query execution plan adding an index lookup operation that may add time to a query. However, the time added by the index lookup operation may be less time than it would take the query executor to execute the query without the index lookup. While a human cannot determine the factor(s) that have the greatest influence on the increased query execution time, a trained neural network type model may identify and rank as the greatest contributors to an increased query execution time the following variables: (1) an increase in the number of join operations, (2) an increase in the number of data objects, and (3) an increase in a size of the data objects. Based on the output from the machine learning model, for a particular future query execution plan, the system may prioritize reducing the number of data objects over reducing the size of the data objects to improve query execution performance.

In one embodiment, the system initiates operations to satisfy the performance criteria automatically without first obtaining user input to authorize the operations. For example, the system may automatically modify weights assigned to features of the cost model used by the optimizer to generate or select a physical execution plan. Additionally, or alternatively, the system may automatically generate instructions to an application to schedule query-execution operations at low-traffic times. Additionally, or alternatively, the system may automatically generate instructions for a data storage platform to partition or cache data objects referenced by a set of SQL statements.

If the system determines that the modified execution plan would not meet the alert and/or recommendation criteria, the system refrains from generating an alert and/or recommendation (Operation 218). The system may refrain from generating recommendations to modify the data objects, applications generating the SQL statements, or query operations.

4. TRAINING A MACHINE LEARNING MODEL TO PREDICT QUERY EXECUTION PLAN PERFORMANCE CONTRIBUTIONS

Figure 3:
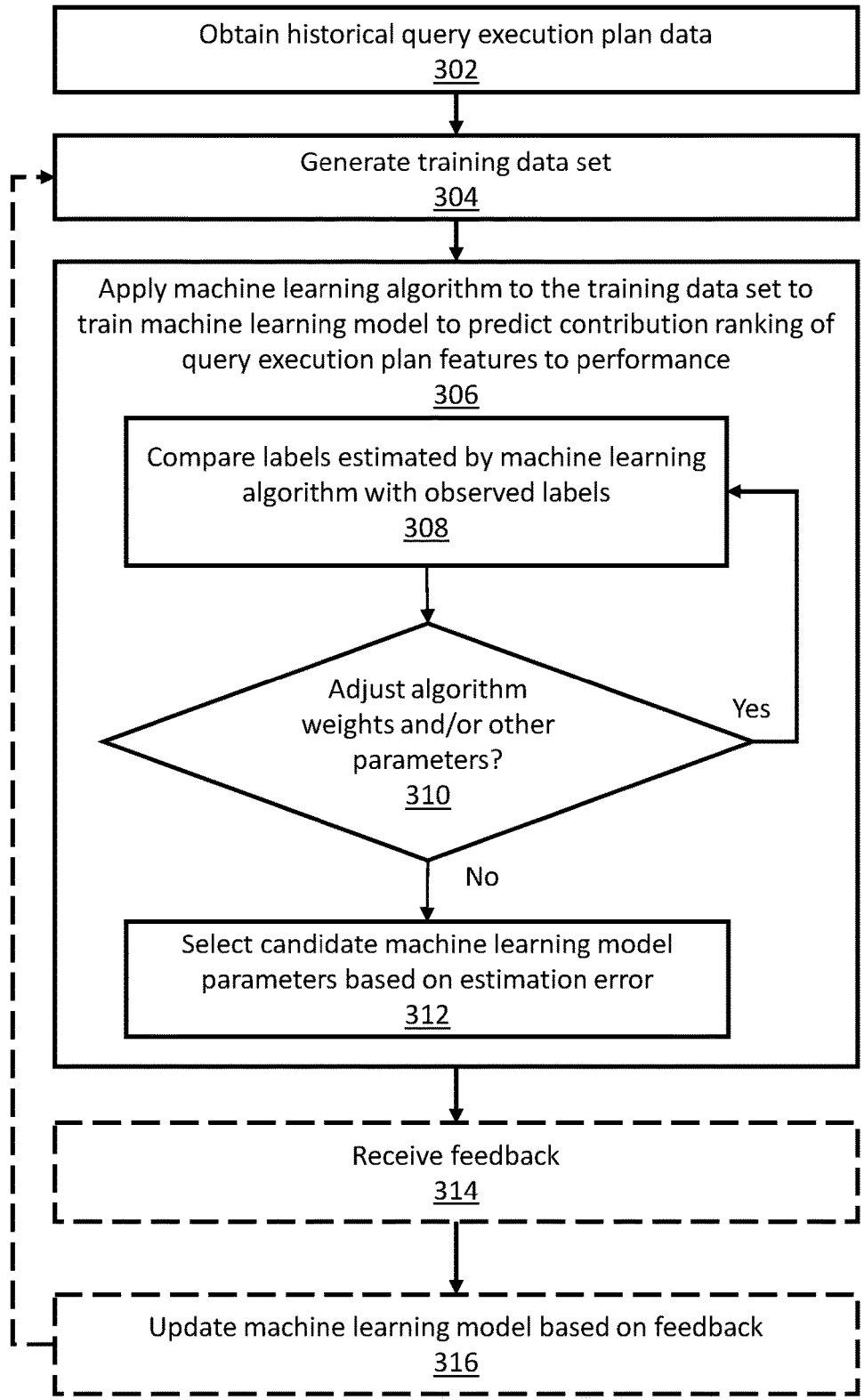
FIG. 3 illustrates an example set of operations for training a machine learning model to predict query execution plan performance contributions.

FIG. 3 illustrates an example set of operations for training a machine learning model to predict relative contributions of features to an execution plan performance. Based on the features identified by the trained machine learning model, a system may generate recommendations for modifying data objects, applications, cost models, and execution plans. One or more operations illustrated in FIG. 3 may be modified, rearranged, or omitted. Accordingly, the particular sequence of operations illustrated in FIG. 3 should not be construed as limiting the scope of one or more embodiments.

A system (e.g., one or more components of system 100 illustrated in FIG. 1) obtains historical query execution plan and performance data (Operation 302). Examples of historical query execution plan data include data objects accessed in a query execution plan, operations (e.g., join operations and index lookup operations) specified in the query execution plan, data object characteristics of the data objects specified in the query execution plan, and cost model characteristics of a cost model applied by an optimizer that generated the query execution plan.

The system uses the historical query execution plan data to generate a set of training data (Operation 304). The set of training data includes, for a particular execution plan in the historical query execution plan data, at least one classification label. For example, the system may identify in the historical data a set of data objects referenced by the execution plan, characteristics of the data objects, and operations performed on data objects and/or data retrieved from the data objects. The system may further identify in the historical query execution plan data information specifying a performance metric, such as a query execution time and/or resource usage values for a CPU, I/O devices, and/or memory.

According to one embodiment, the system obtains the historical data and the training data set from a data repository storing labeled data sets. The training data set may be generated and updated by a database management platform. According to one embodiment, the system generates the labeled set of data by parsing query execution log files and generating labels based on parsed values in the query execution log files. According to an alternative embodiment, one or more users generate labels for a data set.

In some embodiments, generating the training data set includes generating a set of feature vectors for the labeled examples. A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include data object characteristics (such as a number of data objects referenced in an execution plan, a type of data objects, a size of data objects, and a quantity of data stored in the data objects), operations performed by a query executor (such as index lookup operations, results filtering, and results aggregation), an order where operations are performed, and performance metrics (such as a query execution time and resource usage values). In some embodiments, a feature within a feature vector is represented numerically by one or more bits. The system may convert categorical attributes to numerical representations using an encoding scheme, such as one-hot encoding, label encoding, and binary encoding. One-hot encoding creates a unique binary feature for each possible category in an original feature. In one-hot encoding, when one feature has a value of 1, the remaining features have a value of 0. For example, if a query executor may perform ten different types of operations on a set of data objects, the system may generate ten different features of an input data set. When one category is present (e.g., value "1"), the remaining features are assigned a value "0." According to another example, the system may perform label encoding by assigning a unique numerical value to each category. According to yet another example, the system performs binary encoding by converting numerical values to binary digits and creating a new feature for each digit.

The system applies a machine learning algorithm to the training data set to train the machine learning model (Operation 306). For example, the machine learning algorithm may analyze the training data set to train neurons of a neural network with particular weights and offsets to associate a particular data object or execution plan characteristics with particular performance metric values. In some embodiments, the system iteratively applies the machine learning algorithm to a set of input data to generate an output set of labels, compares the generate labels to pre-generated labels associated with the input data, adjusts weights and offsets of the algorithm based on an error, and applies the algorithm to another set of input data.

In some embodiments, the system compares the labels estimated through the one or more iterations of the machine learning model algorithm with observed labels to determine an estimation error (Operation 308). The system may perform this comparison for a test set of examples that may be a subset of examples in the training dataset that were not used to generate and fit the candidate models. The total estimation error for a particular iteration of the machine learning algorithm may be computed as a function of the magnitude of the difference and/or the number of examples that the estimated label wrongly predicted.

In some embodiments, the system determines whether or not to adjust the weights and/or other model parameters based on the estimation error (Operation 310). Adjustments may be made until a candidate model that minimizes the estimation error or otherwise achieves a threshold level of estimation error is identified. The process may return to Operation 308 to make adjustments and continue training the machine learning model.

In some embodiments, the system selects machine learning model parameters based on the estimation error meeting a threshold accuracy level (Operation 312). For example, the system may select a set of parameter values for a machine learning model based on determining that the trained model has an accuracy level for predicting labels for medical claims of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. As previously mentioned, a given example may include sets of query execution plans. Each query execution plan may be processed as a separate discrete instance of time. For instance, an example may include query execution plans $q_1$, $q_2$, and $q_3$ corresponding to times t, t+1, and t+2, respectively. Backpropagation through time may perform adjustments through gradient descent starting at time t+2 and moving backward in time to t+1 and then to t.

Additionally, or alternatively, the system may train other types of machine learning models. For example, the system may adjust the boundaries of a hyperplane in a support vector machine or node weights within a decision tree model to minimize estimation error. Once trained, the machine learning model may be used to estimate labels for new examples of query execution plans.

In embodiments where the machine learning algorithm is a supervised machine learning algorithm, the system may optionally obtain feedback on the various aspects of the analysis described above (Operation 314). For example, the feedback may affirm or revise labels generated by the machine learning model. The machine learning model may indicate that a size of data objects associated with a query execution plan is the primary contributor to the query execution plan failing to meet performance thresholds. The system may receive feedback indicating that a number of join operations for joining data objects should instead be categorized as the primary contributor to the query execution plan failing to meet the performance thresholds. Based on the feedback, the machine learning training set may be updated, thereby improving its analytical accuracy (Operation 316). Once updated, the system may further train the machine learning model by optionally applying the model to additional training data sets.

5. EXAMPLE EMBODIMENT

A detailed example is described below for purposes of clarity. Components and/or operations described below should be understood as one specific example that may not be applicable to certain embodiments. Accordingly, components and/or operations described below should not be construed as limiting the scope of any of the claims.

A data management platform receives a request to initiate a performance analysis of queries to a database for a set of applications associated with a client (Operation 402). The request is a regularly scheduled request to alert clients when there may be changes to the clients' service quality. The performance analysis is for applications accessing a database. For example, the database management platform may alert growing clients that may be placing increasing demands on a database server that the client may wish to modify available resources or existing applications to minimize disruptions to the clients' services.

Based on the request to analyze the performance of queries to a database, the data management platform identifies a set of SQL statements generated by the set of applications (Operation 404). The system identifies one hundred (100) queries initiated by the set of applications within the last month. The system identifies fifty (50) separate SQL statements generated by the applications to initiate the 100 queries.

The system identifies a set of target data objects associated with the set of SQL statements (Operation 406). The system identifies the data objects accessed by the set of SQL statements. For example, the SQL statements may expressly identify one set of data objects. The system may identify additional data objects that would be required to execute a query by joining the additional data objects to those expressly identified in the SQL statements.

The system applies a time-series type machine learning model to historical time-series data for the set of target data objects to generate the prediction of future characteristics of the target data objects (Operation 408). The system accesses query log files to retrieve the historical time-series data for the set of target data objects. The historical time-series data includes the following: a number of data objects associated with the query, a number of indexes accessed to execute the query, the size (e.g., the number of rows and/or columns) of tables associated with the query, the amount of data stored in a table, operations performed on data, filters applied to the data, a type of data object accessed, a type of data accessed, and an execution time associated with the query.

Figure 4:
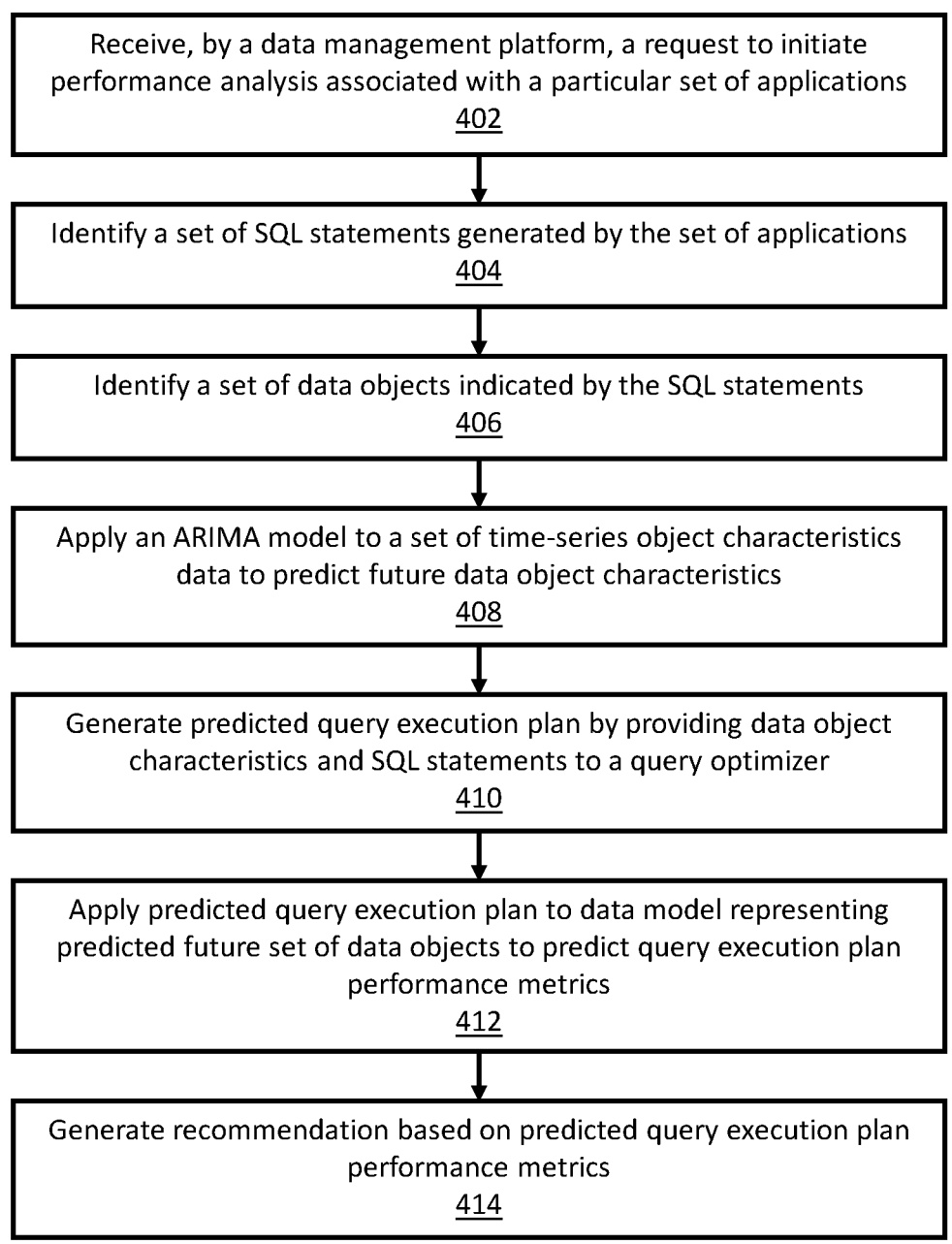
FIG. 4 illustrates a set of operations according to an example embodiment.

In the example embodiment of FIG. 4, the time-series type machine learning model is an ARIMA type model. The system creates the ARIMA-type model by generating a set of training data from the historical data object characteristics data. The system plots the historical data object characteristics time series data to identify characteristics, such as seasonality, trends, and other patterns, in the data. Based on determining that the historical data object characteristics data is stationary, the system selects the ARIMA model to generate predictions of future data object characteristics. In training the ARIMA model, the system selects values for the parameters d, p, and q of the ARIMA model that correspond to the best fit between output values and test output values.

Based on applying the ARIMA model to the historical data object characteristics data, the ARIMA model predicts future data object characteristics including the following: an increase in a number of tables in a database, a change in the number of rows of the tables, an increase of no more than two columns in one group of tables among the set of tables, a decrease in the number of columns in another group of tables among the set of tables, an increase in the quantity of data stored in the set of tables, an increase in the number of join operations required to join tables to execute the queries corresponding to the SQL statements, and the addition of an index to reference at least some tables among the set of tables.

The system determines that the predicted changes to the data object characteristics correspond to a modified execution plan for the set of SQL statements (Operation 410). In particular, the system provides the predicted data object characteristics and the set of SQL statements to a database server's optimizer to select a physical execution plan for executing a set of queries based on the SQL statements. The system compares the physical execution plan selected by the optimizer to a presently executed physical execution plan to identify changes to the execution plan.

The system applies the predicted modified physical execution plan to a data model representing a predicted future set of data objects to predict query execution plan performance metrics (Operation 412). The system generates the data model representing the predicted future set of data objects based on the predicted data object characteristics generated by the time-series ARIMA model. The data model includes table identifiers for different tables and indexes. However, the data model does not store the actual data contained within the tables. The system generates the future execution plan performance by applying the predicted future physical execution plan to the data model. The system estimates the time required to perform the operations specified in the predicted future physical execution plan to access the predicted future set of data objects and perform any operations on the retrieved data such as any filtering or aggregation operations specified in the execution plan. The system estimates the resources used, including CPU, I/O, and memory usage to perform the operations specified in the predicted future physical execution plan.

Based on applying the predicted future physical execution plan to the predicted set of data objects, the system determines the predicted query execution plan meets alert/recommendation criteria (Operation 414). The system generates a recommendation to partition some of the data objects to reduce times required to access data in the data objects. In addition, the system generates a recommendation to change the cost model used by the optimizer to generate the execution plan. In the example embodiment illustrated in FIG. 4, the system determines that the execution time for a set of queries based on the predicted query execution plan exceeds an execution time threshold. The system further determines that the resource usage for executing the set of queries also exceeds a resource usage threshold. A user interacts with a data management platform to indicate that the system should generate a recommendation to improve the query response time even at the cost of further increasing the resource usage of the database server. Based on the user input, the system generates a recommendation to increase the weight associated with query execution times in the optimizer's cost model. The system further recommends reducing the weight associated with resource usage. In other words, the system recommends modifying the cost model, so the optimizer will select operations and orders of executing operations that give priority to a faster overall query execution time over reducing resource usage.

The system presents the recommendation to a user via a graphical user interface (GUI). Based on a user confirmation, the system modifies the data objects to partition the data objects. In addition, the system modifies the optimizer's cost model to prioritize query execution speed over reducing resource usage.

According to the above example embodiment, the system may customize and modify how queries are made to a database based on predicted characteristics of data objects that are the target of the queries. The system identifies the data objects based on SQL statements generated by applications.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources.

Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use the same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with the same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with the same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates the tenants that have authorization to access specific applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
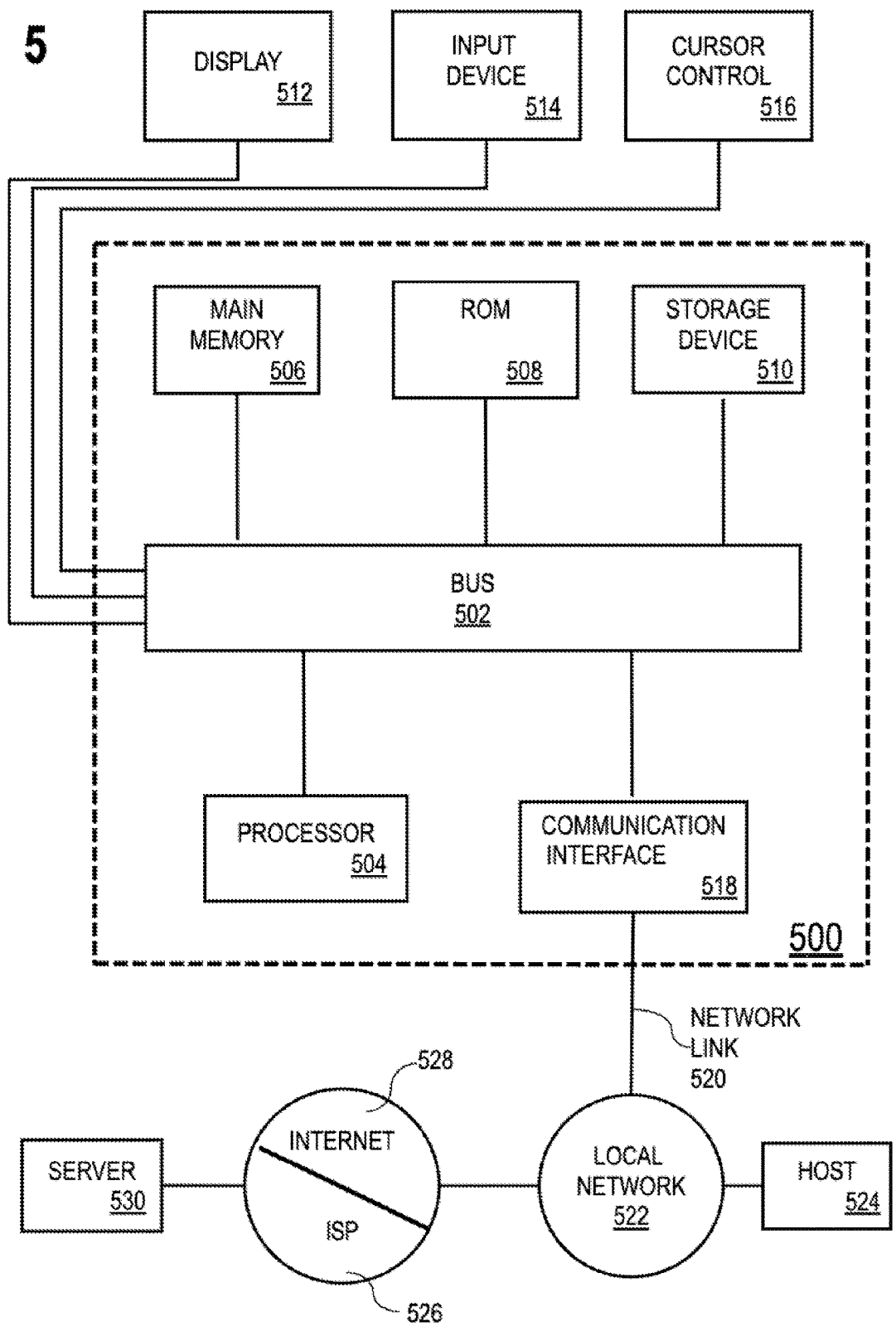
FIG. 5 shows a block diagram that illustrates a computer system in accordance with one or more embodiments.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read-only memory (ROM) 508 or other static storage device coupled to bus 502 for storing static information and instructions for processor 504. A storage device 510, such as a magnetic disk, optical disk, or a Solid-State Drive (SSD), is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506. The processor 504 retrieves and executes the instructions from the main memory 506. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518 that carry the digital data to and from computer system 500 are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. MISCELLANEOUS; EXTENSIONS

Unless otherwise defined, terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
accessing, by a database management platform configured for generating structured query language (SQL) execution plans for executing queries on a database, historical characteristics of a set of data objects referenced by a set of SQL statements, the set of data objects comprising one or more data objects, the set of SQL statements comprising one or more SQL statements;
predicting, by the database management platform, future characteristics of the set of data objects based at least on the historical characteristics of the set of data objects;
predicting, by the database management platform, characteristics of a future SQL execution plan for the set of SQL statements based at least in part on the future characteristics of the set of data objects;
predicting, by the database management platform, a first performance for the future SQL execution plan based on the predicted characteristics of the future SQL execution plan; and
based on predicting the performance for the future SQL execution plan, performing at least one of:
generating a recommendation for modifying at least one of the set of data objects and parameters for generating SQL execution plans;
modifying the set of data objects; and
modifying the parameters for generating the SQL execution plans.

2. The one or more non-transitory computer readable media of claim 1, wherein the operations further comprise: generating a notification corresponding to the performance for the future SQL execution plan.

3. The one or more non-transitory computer readable media of claim 1, wherein the recommendation comprises a recommended configuration for a set of resources that allows for execution of the future SQL execution plan,
wherein a first set of performance metric values associated with the recommended configuration for the set of resources exceed a second set of performance metric values associated with current configuration for the set of resources.

4. The one or more non-transitory computer readable media of claim 1, wherein the recommendation comprises a recommended configuration for the set of objects that prevents generation of the future SQL execution plan.

5. The one or more non-transitory computer readable media of claim 1, wherein the recommendation comprises modifying a schedule for executing a set of queries based on the future SQL execution plan.

6. The one or more non-transitory computer readable media of claim 1, wherein the recommendation comprises a recommendation to modify at least one application accessing the data objects.

7. The one or more non-transitory computer readable media of claim 1, wherein the operations further comprise:
identifying the set of SQL statements at least by identifying a set of logical plans specifying join operations connecting the set of data objects.

8. A method comprising:
accessing, by a database management platform configured for generating structured query language (SQL) execution plans for executing queries on a database, historical characteristics of a set of data objects referenced by a set of SQL statements, the set of data objects comprising one or more data objects, the set of SQL statements comprising one or more SQL statements;
predicting, by the database management platform, future characteristics of the set of data objects based at least on the historical characteristics of the set of data objects;
predicting, by the database management platform, characteristics of a future SQL execution plan for the set of SQL statements based at least in part on the future characteristics of the set of data objects;
predicting, by the database management platform, a first performance for the future SQL execution plan based on the predicted characteristics of the future SQL execution plan; and
based on predicting the performance for the future SQL execution plan, performing at least one of:
generating a recommendation for modifying at least one of the set of data objects and parameters for generating SQL execution plans;
modifying the set of data objects; and
modifying the parameters for generating the SQL execution plans.

9. The method of claim 8, further comprising: generating a notification corresponding to the first performance for the future SQL execution plan.

10. The method of claim 8, wherein the recommendation comprises a recommended configuration for a set of resources that allows for execution of the future SQL execution plan,
wherein a first set of performance metric values associated with the recommended configuration for the set of resources exceed a second set of performance metric values associated with current configuration for the set of resources.

11. The method of claim 8, wherein the recommendation comprises a recommended configuration for the set of objects that prevents generation of the future SQL execution plan.

12. The method of claim 8, wherein the recommendation comprises modifying a schedule for executing a set of queries based on the future SQL execution plan.

13. The method of claim 8, wherein the recommendation comprises a recommendation to modify at least one application accessing the data objects.

14. The method of claim 8, further comprising:
identifying the set of SQL statements at least by identifying join operations for connecting the set of data objects.

15. A system comprising:
at least one device including a hardware processor;
the system being configured to perform operations comprising:
accessing, by a database management platform configured for generating structured query language (SQL) execution plans for executing queries on a database, historical characteristics of a set of data objects referenced by a set of SQL statements, the set of data objects comprising one or more data objects, the set of SQL statements comprising one or more SQL statements;
predicting, by the database management platform, future characteristics of the set of data objects based at least on the historical characteristics of the set of data objects;
predicting, by the database management platform, characteristics of a future SQL execution plan for the set of SQL statements based at least in part on the future characteristics of the set of data objects;
predicting, by the database management platform, a first performance for the future SQL execution plan based on the predicted characteristics of the future SQL execution plan; and
based on predicting the performance for the future SQL execution plan, performing at least one of:
generating a recommendation for modifying at least one of the set of data objects and parameters for generating SQL execution plans;
modifying the set of data objects; and
modifying the parameters for generating the SQL execution plans.

16. The system of claim 15, wherein the operations further comprise: generating a notification corresponding to the first performance for the future SQL execution plan.

17. The system of claim 15, wherein the recommendation comprises a recommended configuration for a set of resources that allows for execution of the future SQL execution plan,
wherein a first set of performance metric values associated with the recommended configuration for the set of resources exceed a second set of performance metric values associated with current configuration for the set of resources.

* * * * *